(12) United States Patent
Thielman et al.

(10) Patent No.: US 12,110,956 B2
(45) Date of Patent: Oct. 8, 2024

(54) COMPACT FORCE APPLYING DEVICE

(71) Applicant: WAGSTAFF, INC., Spokane Valley, WA (US)

(72) Inventors: Brett Thielman, Spokane Valley, WA (US); Craig Cordill, Spokane Valley, WA (US)

(73) Assignee: WAGSTAFF, INC., Spokane Valley, WA (US)

( * ) Notice: Subject to any disclaimer, the term of this patent is extended or adjusted under 35 U.S.C. 154(b) by 167 days.

(21) Appl. No.: 17/649,427

(22) Filed: Jan. 31, 2022

(65) Prior Publication Data

US 2023/0243411 A1 Aug. 3, 2023

(51) Int. Cl.
| | | |
|---|---|---|
| *F16H 55/22* | (2006.01) |
| *B22D 11/049* | (2006.01) |
| *B22D 11/05* | (2006.01) |
| *F16H 1/22* | (2006.01) |
| *F16H 57/039* | (2012.01) |

(52) U.S. Cl.
CPC ........... *F16H 55/22* (2013.01); *B22D 11/049* (2013.01); *B22D 11/05* (2013.01); *F16H 1/225* (2013.01); *F16H 57/039* (2013.01)

(58) Field of Classification Search
CPC ..... F16H 1/16; F16H 25/20; F16H 2025/2059
See application file for complete search history.

(56) References Cited

U.S. PATENT DOCUMENTS

| 495,191 | A | * | 4/1893 | Thompson | .......... | B61H 15/0028 |
|---|---|---|---|---|---|---|
| | | | | | | 188/196 BA |
| 1,665,376 | A | * | 4/1928 | Moorhouse | ........... | B60T 11/043 |
| | | | | | | 188/194 |
| 2006/0231352 | A1 | * | 10/2006 | Funk | ...................... | B60T 13/746 |
| | | | | | | 188/72.8 |

FOREIGN PATENT DOCUMENTS

| CN | 107524772 | A | | 12/2017 | | |
|---|---|---|---|---|---|---|
| GB | 149678 | A | * | 1/1922 | ......... | B61H 15/0085 |
| JP | S602005 | U | | 1/1985 | | |
| JP | H0374745 | U | | 7/1991 | | |
| JP | 6494144 | B1 | | 4/2019 | | |

OTHER PUBLICATIONS

International Search Report and Written Opinion for PCT/2023/061548 (ISA/EP) mailed Apr. 28, 2023 (13 pages).

* cited by examiner

*Primary Examiner* — Jake Cook
(74) *Attorney, Agent, or Firm* — Alston & Bird LLP

(57) ABSTRACT

The present invention relates to a system and apparatus for application of force in a compact form factor. An apparatus for application of force includes: a worm gear; a worm wheel gear engaged with the worm gear; a gear shaft coaxial to the worm gear and rotatably coupled to the worm wheel gear; a first threaded hole proximate a first end of the gear shaft; a second threaded hole proximate a second end of the gear shaft opposite the first end; a first threaded shaft received by the first threaded hole; and a second threaded shaft received by the second threaded hole, where the first threaded shaft and the second threaded shaft are configured to advance toward one another and away from one another responsive to rotation of the worm gear.

20 Claims, 15 Drawing Sheets

US 12,110,956 B2

COMPACT FORCE APPLYING DEVICE

TECHNOLOGICAL FIELD

The present invention relates to a system and apparatus for application of force in a compact form factor, and more particularly, to a system and apparatus for a compact gearbox configured to be positioned between two objects to draw together the two objects and to push apart the two objects.

BACKGROUND

Force applying devices are useful in a wide variety of applications. Applications that utilize force applying devices include applications such as jacks that lift vehicles to change tires, automatic door opening devices, and other applications where motion is imparted by a mechanical device. Hydraulically driven devices are often used in such applications where a pump may transfer hydraulic fluid from one chamber to another to create motion, such as for driving a piston. The transfer of hydraulic fluid can be by mechanical means, such as in the case of a bottle jack, or through electrical means, such as an electric pump used to drive a hydraulic cylinder used in lifting a dump truck bed. Electrical force applying devices can employ motors to rotate a shaft that drive gears to impart motion, such as with a rack and pinion. The form factors of different force applying devices vary based on application, and typically larger devices have the capacity to apply greater forces over greater distances.

BRIEF SUMMARY

The present invention relates to a system and apparatus for application of force in a compact form factor, and more particularly, to a system and apparatus for a compact gearbox configured to be positioned between two objects to draw together the two objects and to push apart the two objects. Embodiments provided herein include an apparatus for application of force including: a worm gear; a worm wheel gear engaged with the worm gear; a gear shaft coaxial to the worm gear and rotatably coupled to the worm wheel gear; a first threaded hole proximate a first end of the gear shaft; a second threaded hole proximate a second end of the gear shaft opposite the first end; a first threaded shaft received by the first threaded hole; and a second threaded shaft received by the second threaded hole, where the first threaded shaft and the second threaded shaft are configured to advance toward one another and away from one another responsive to rotation of the worm gear which rotates the worm wheel gear and in turn the gear shaft relative to the first threaded shaft and the second threaded shaft.

According to an example embodiment, the second threaded shaft defines a cavity, where in response to the first threaded shaft and the second threaded shaft advancing toward one another, the first threaded shaft is received within the cavity of the second threaded shaft. In response to the first threaded shaft and the second threaded shaft advancing toward one another or away from one another, in an example embodiment, the first threaded shaft exerts a first force on a first object coupled to the first shaft and the second threaded shaft exerts a second force on a second object coupled to the second shaft, where the first force and the second force are equal and opposite. The first threaded shaft and the second threaded shaft are, in certain embodiments, coaxial. The first threaded shaft and the second threaded shaft are, in certain embodiments, held rotatably fixed.

According to an example embodiment, the worm wheel gear is a first worm wheel gear and the gear shaft is a first gear shaft, the apparatus further including: a second worm wheel gear engaged with the worm gear, a second gear shaft coaxial to the second worm wheel gear and rotatably coupled to the second worm wheel gear; a third threaded hole proximate a first end of the second gear shaft, a fourth threaded hole proximate a second end of the second gear shaft; a third threaded shaft received by the third threaded hole; and a fourth threaded shaft received by the fourth threaded hole, where the third threaded shaft and the fourth threaded shaft are configured to advance toward one another and away from one another responsive to rotation of the worm gear which rotates the second worm wheel gear and in turn the second gear shaft relative to the third threaded shaft and the fourth threaded shaft.

According to an example embodiment, the apparatus further includes a gearbox housing the worm gear, the first worm wheel gear, the first gear shaft, the second worm wheel gear, and the second gear shaft, where the first threaded shaft and the fourth threaded shaft are disposed on a first side of the gearbox and the second threaded shaft and third threaded shaft are disposed on a second side of the gearbox. According to certain embodiments, the first threaded shaft, second threaded shaft, third threaded shaft, and fourth threaded shaft each move in unison at the same rate either toward the gearbox or away from the gearbox in response to rotation of the worm gear. According to certain embodiments, a first object is attached to the first threaded shaft and the fourth threaded shaft and a second object is attached to the second threaded shaft and the third threaded shaft, where the first threaded shaft and the second threaded shaft apply a first force between the first object and the second object in response to a first rotation of the worm gear, and where the third threaded shaft and the fourth threaded shaft apply a second force between the first object and the second object in response to the first rotation of the worm gear, wherein the first force is different from the second force. According to some embodiments, the first threaded hole includes a first thread pitch and a first diameter, the second threaded hole includes a second thread pitch and a second diameter, where the first thread pitch is the same as the second thread pitch, and where the first diameter is different than the second diameter. According to some embodiments, the second threaded shaft defines a cavity therein, where the cavity includes a diameter greater than the first diameter. The first threaded shaft and the second threaded shaft are, in certain embodiments, coaxial and extend along a first axis, where the first axis is perpendicular to an axis of rotation of the worm gear.

Embodiments provided herein include a system for application of force including: a gear shaft, where the gear shaft defines proximate a first end a first threaded hole and proximate a second end a second threaded hole; a first threaded shaft received within the first threaded hole, the first threaded shaft having a first diameter; a second threaded shaft received within the second threaded hole, where the second threaded shaft defines a cavity including a cavity diameter greater than the first diameter; where the first threaded shaft and the second threaded shaft advance toward one another in response to rotation of the gear shaft relative to the first threaded shaft and the second threaded shaft in a first direction, where the first threaded shaft is received into the cavity as the first threaded shaft and the second threaded shaft continue to advance toward one another.

According to some embodiments, the system further includes: a worm wheel gear attached to the gear shaft, a worm gear engaging the worm wheel gear and configured to rotate the worm wheel gear in response to rotation of the worm gear. The first threaded shaft and the second threaded shaft are, in certain embodiments, coaxial and extend along a first axis, where the first axis is perpendicular to an axis of rotation of the worm gear. Rotation of the worm gear in a first direction causes, in some embodiments, the first threaded shaft to advance toward the second threaded shaft. Rotation of the worm gear in a second direction causes, in some embodiments, the first threaded shaft and the second threaded shaft to advance away from one another.

According to some embodiments, the system further includes a first object attached to the first threaded shaft and a second object attached to the second threaded shaft, where rotation of the worm gear in the first direction draws the first object toward the second object, and where rotation of the worm gear in the second direction pushes the first object away from the second object. According to some embodiments, a force applied by the first threaded shaft to the first object is equal to and opposite a force applied by the second threaded shaft to the second object. The first threaded shaft and the second threaded shaft have, in some embodiments, the same thread pitch. According to certain embodiments, a maximum stroke distance is defined as a greatest distance the first threaded shaft moves relative to the second threaded shaft, where the maximum stroke distance is longer than a length of the gear shaft along its axis.

BRIEF DESCRIPTION OF THE DRAWINGS

Figure 1:
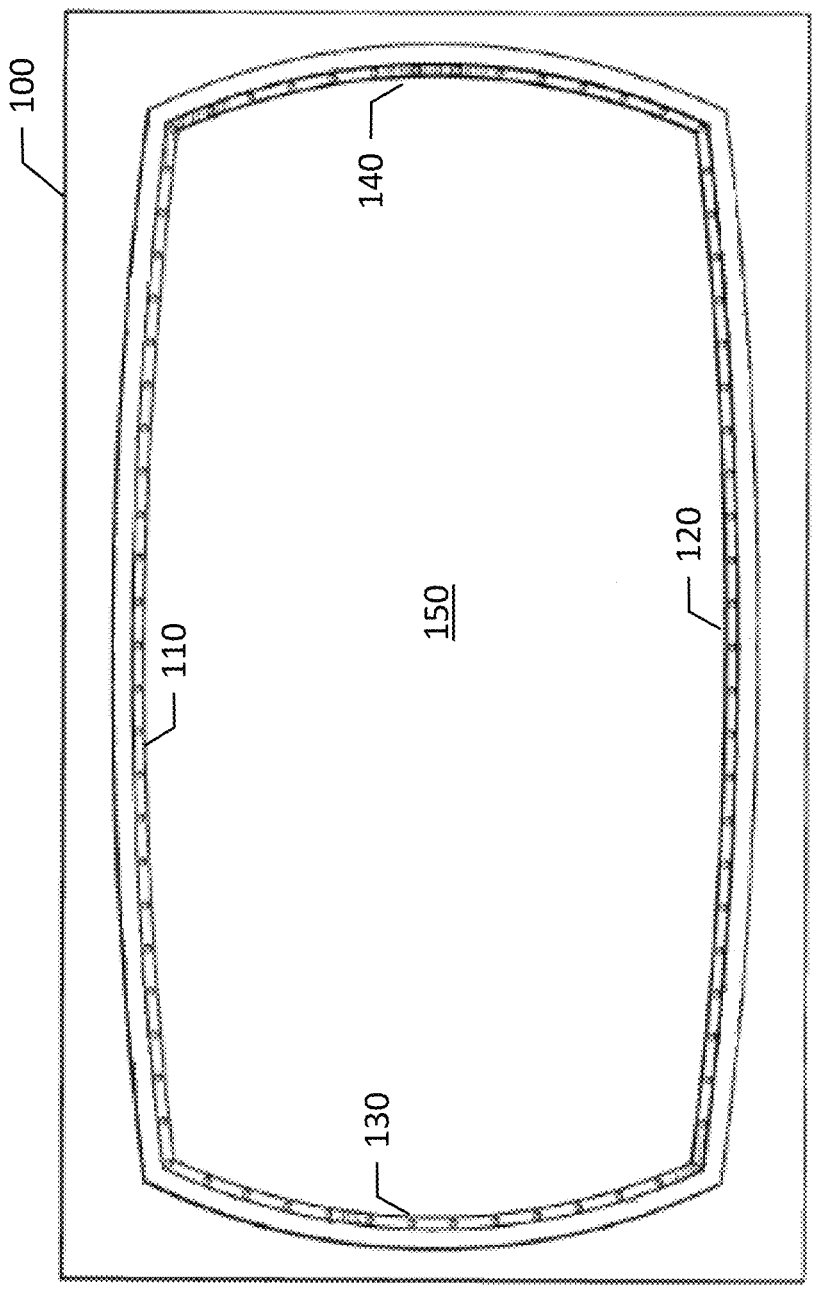
Figure 2:
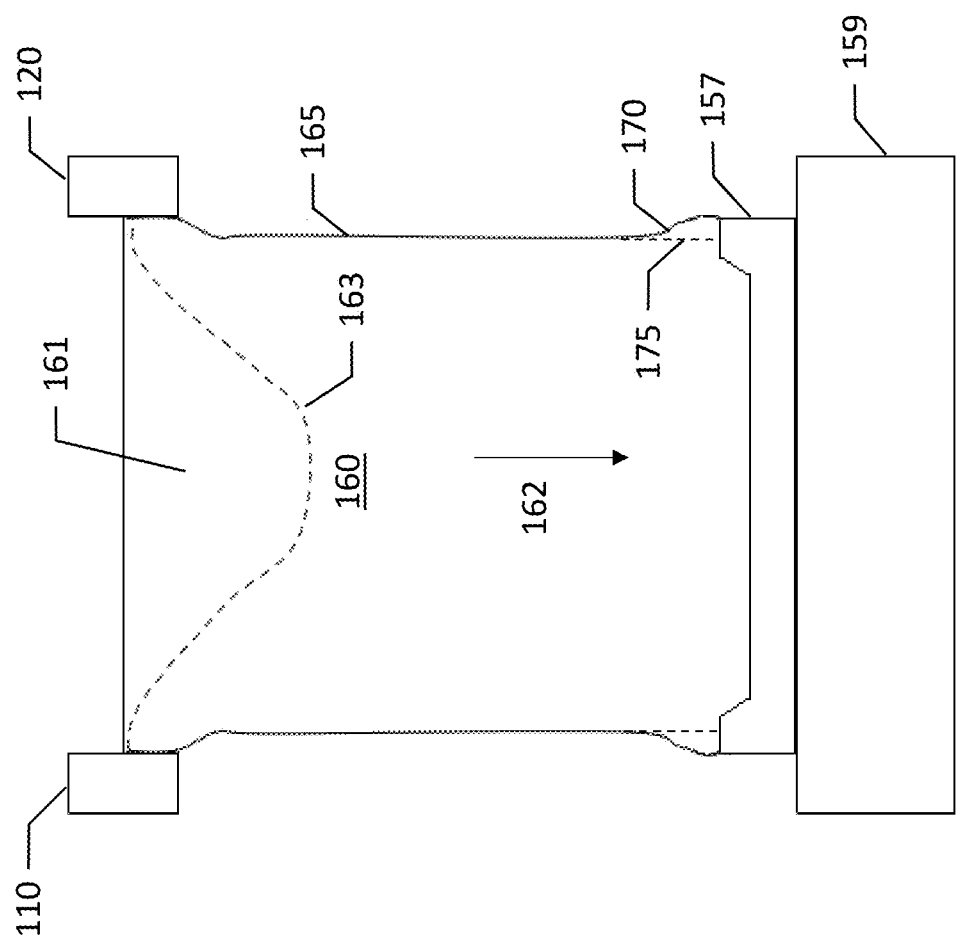
Figure 3:
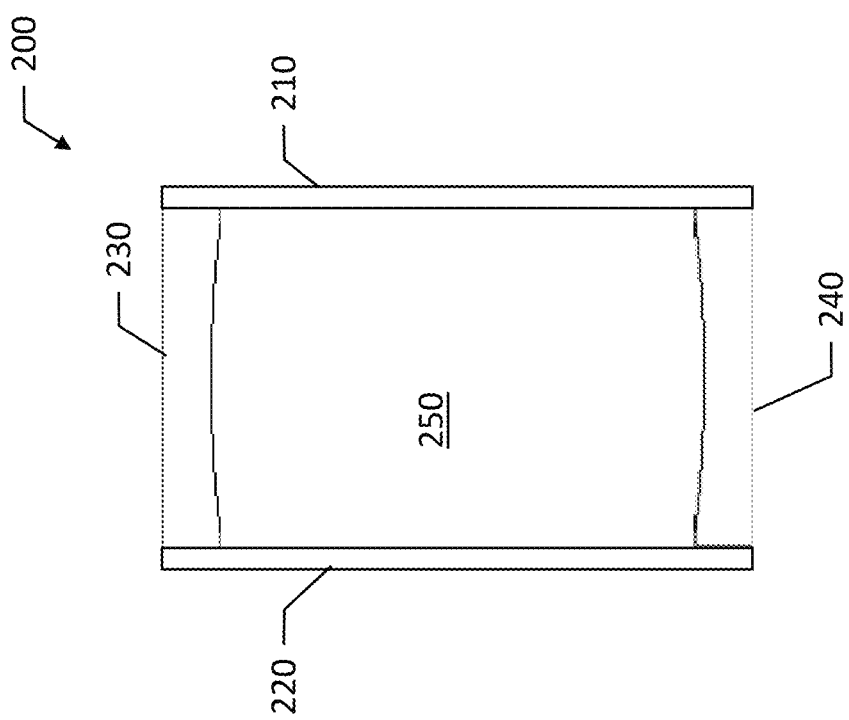
Figure 4:
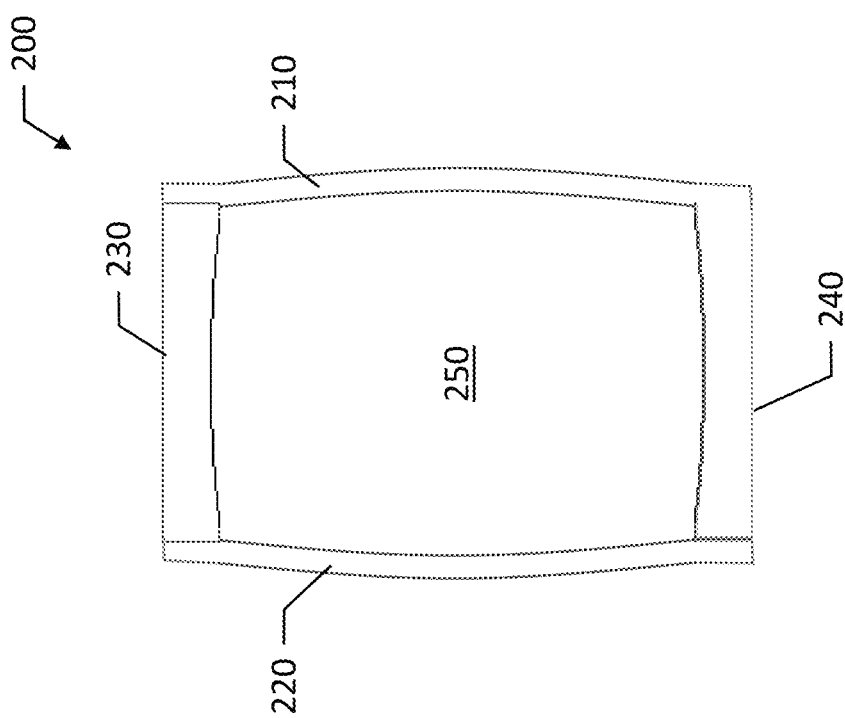
Figure 5:
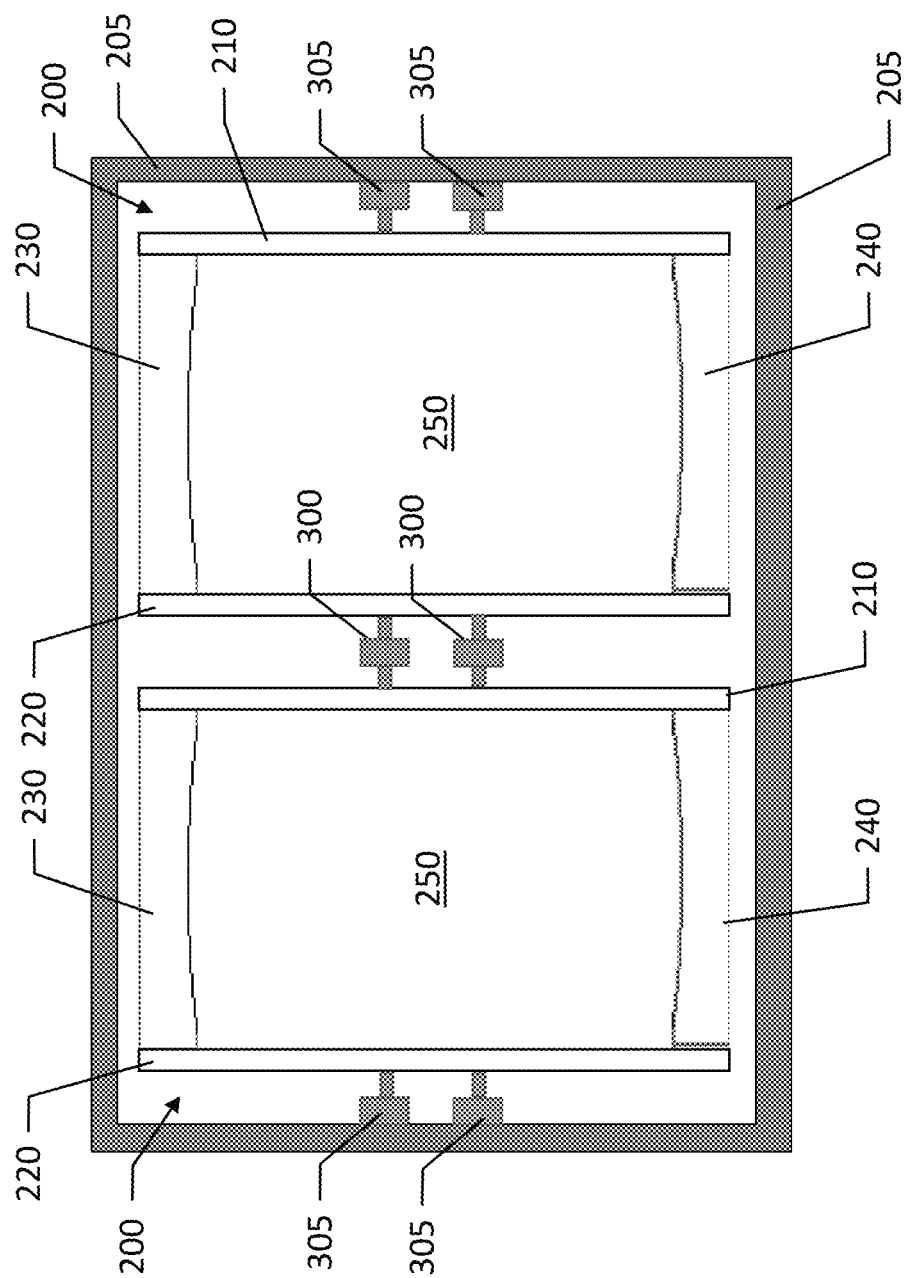
Figure 6:
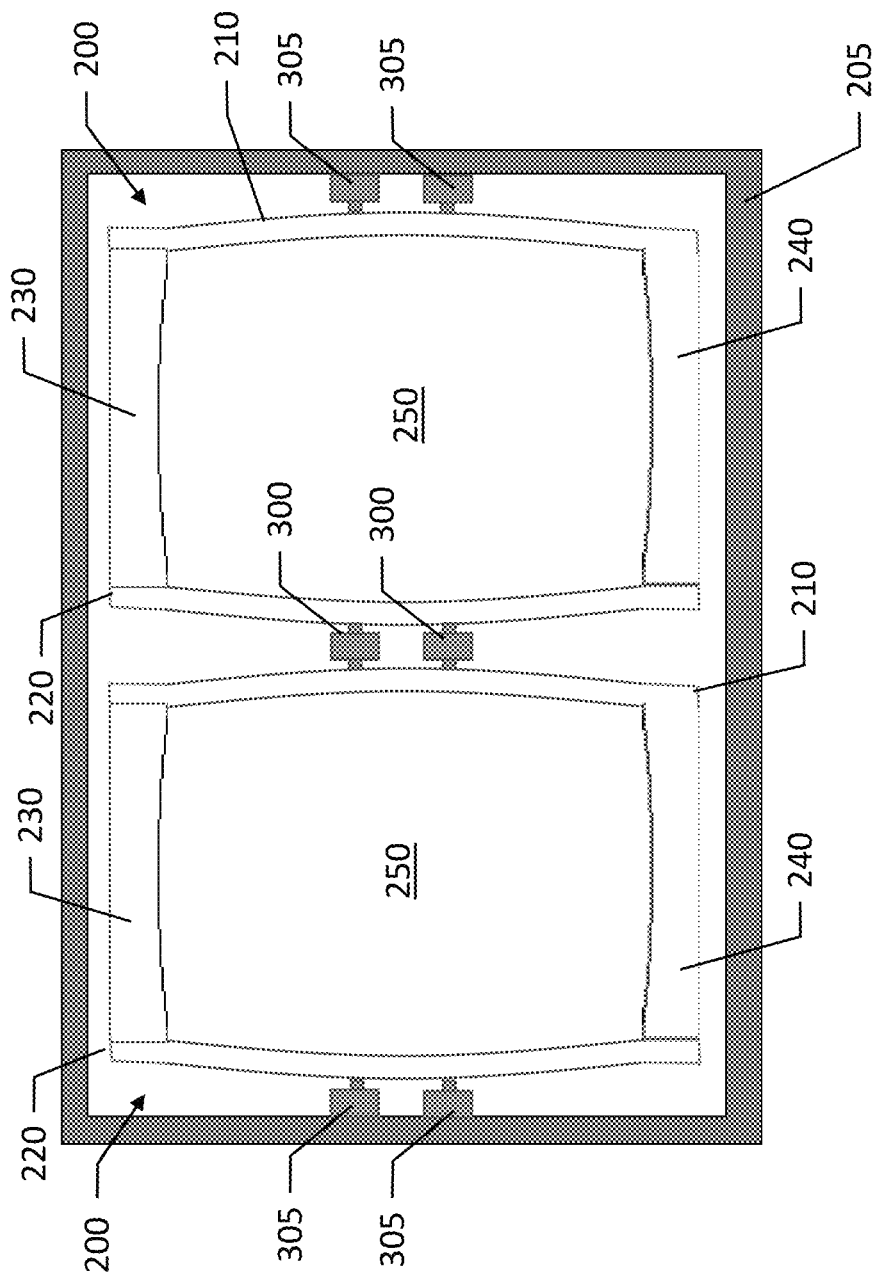
Figure 7:
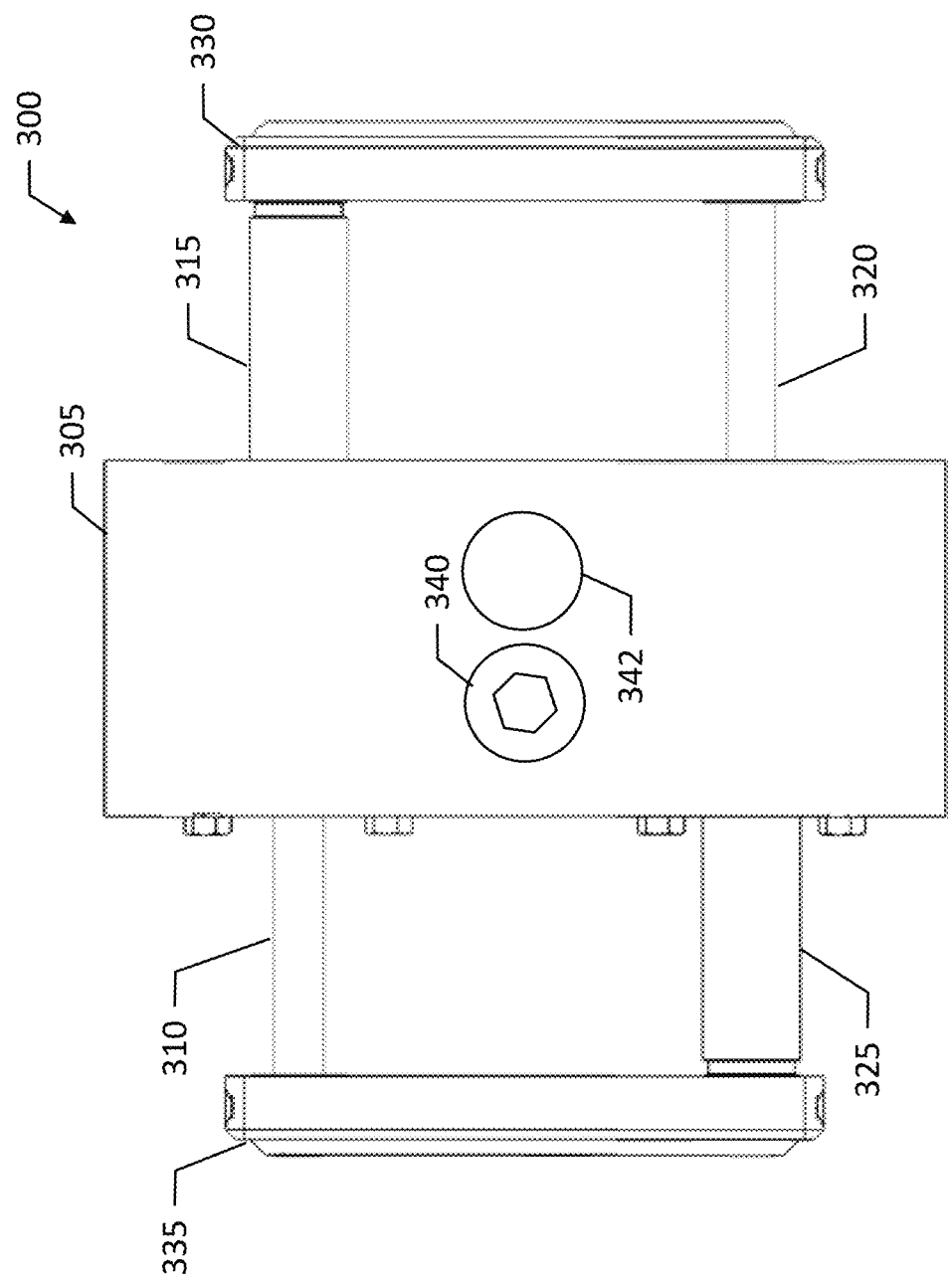
Figure 8:
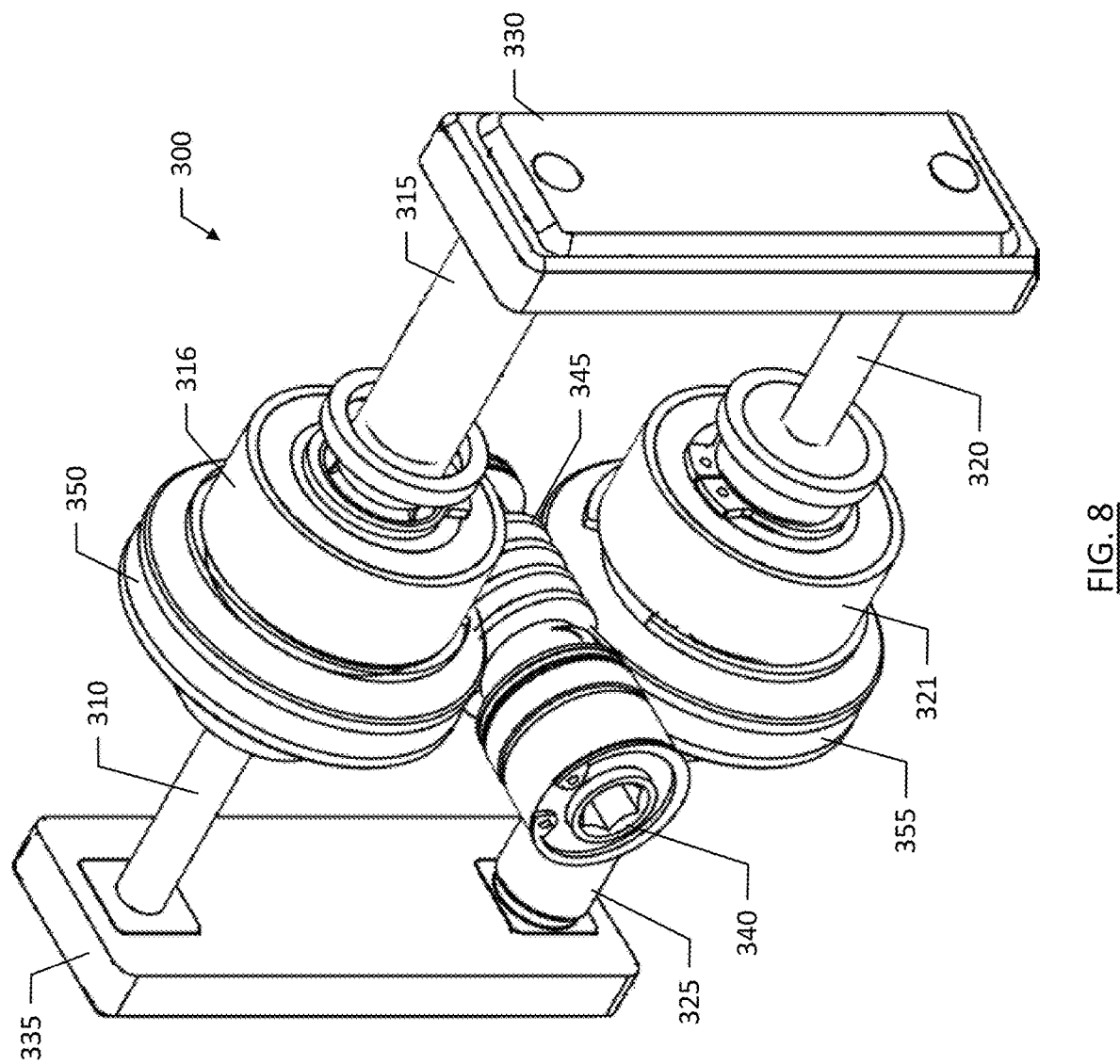
Figure 9:
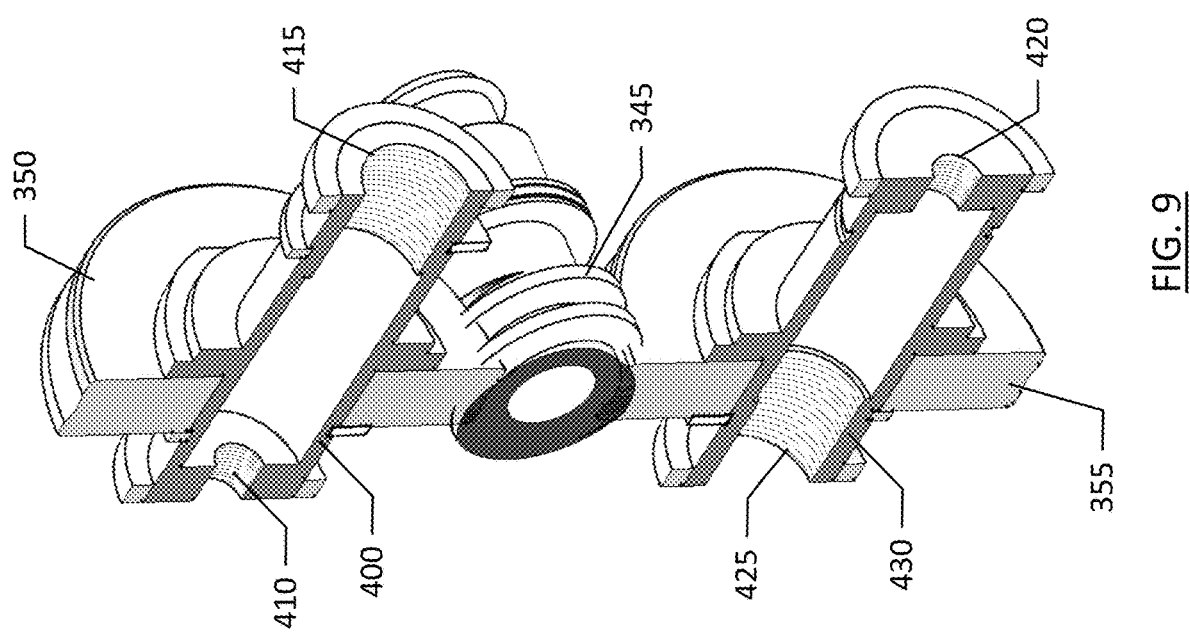
Figure 10:
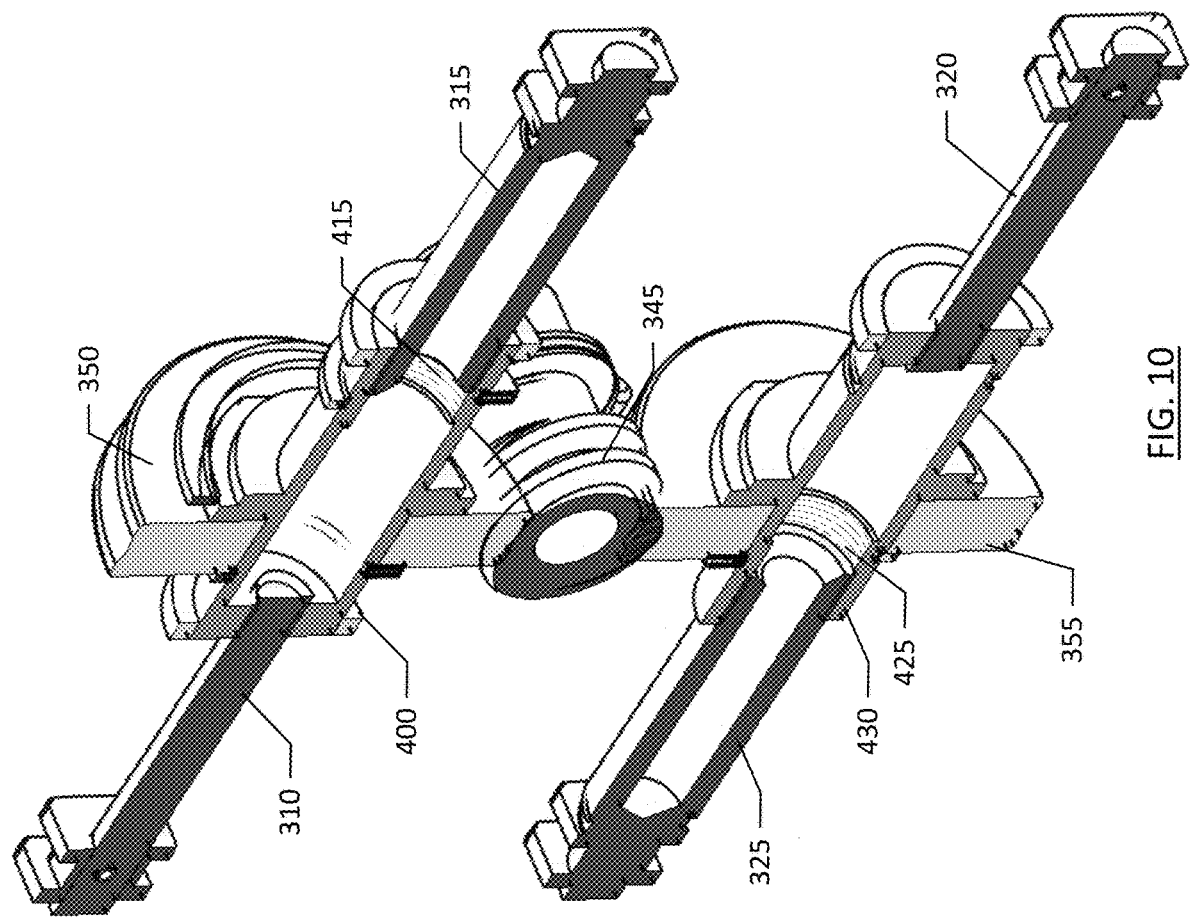
Figure 11:
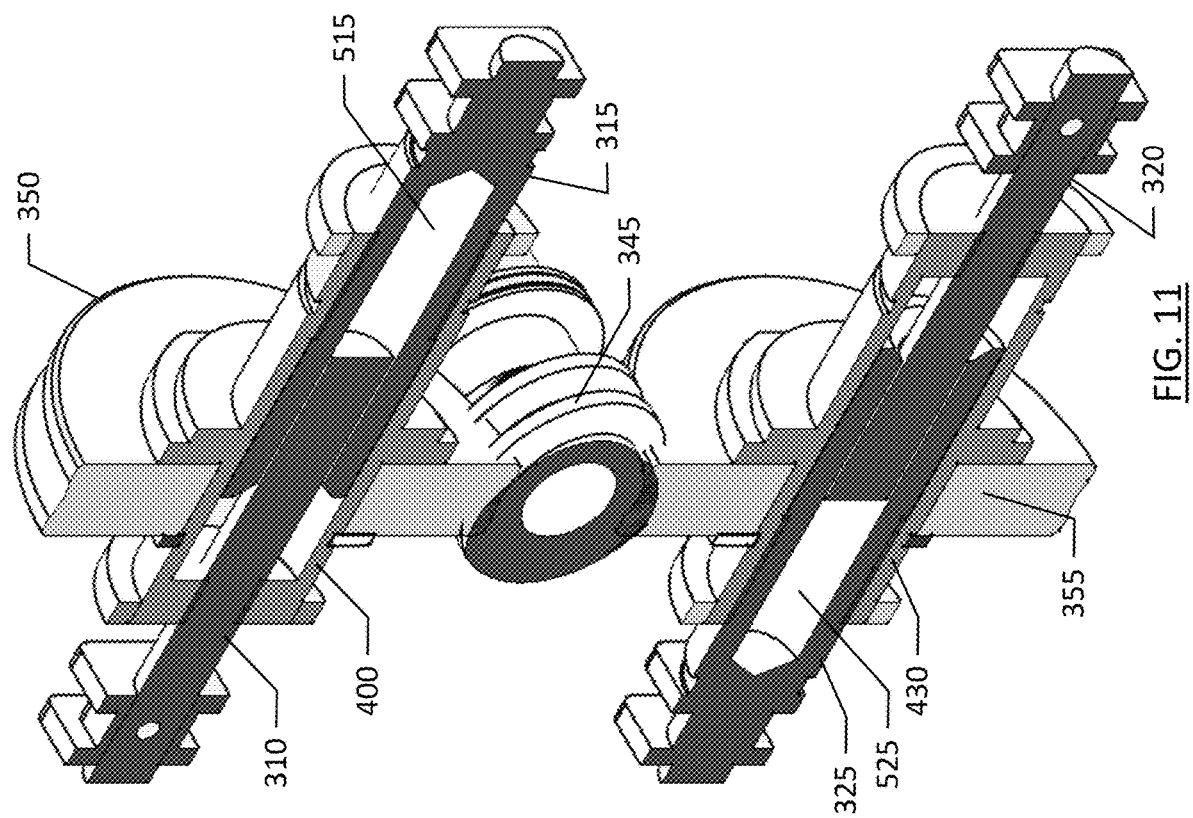
Figure 12:
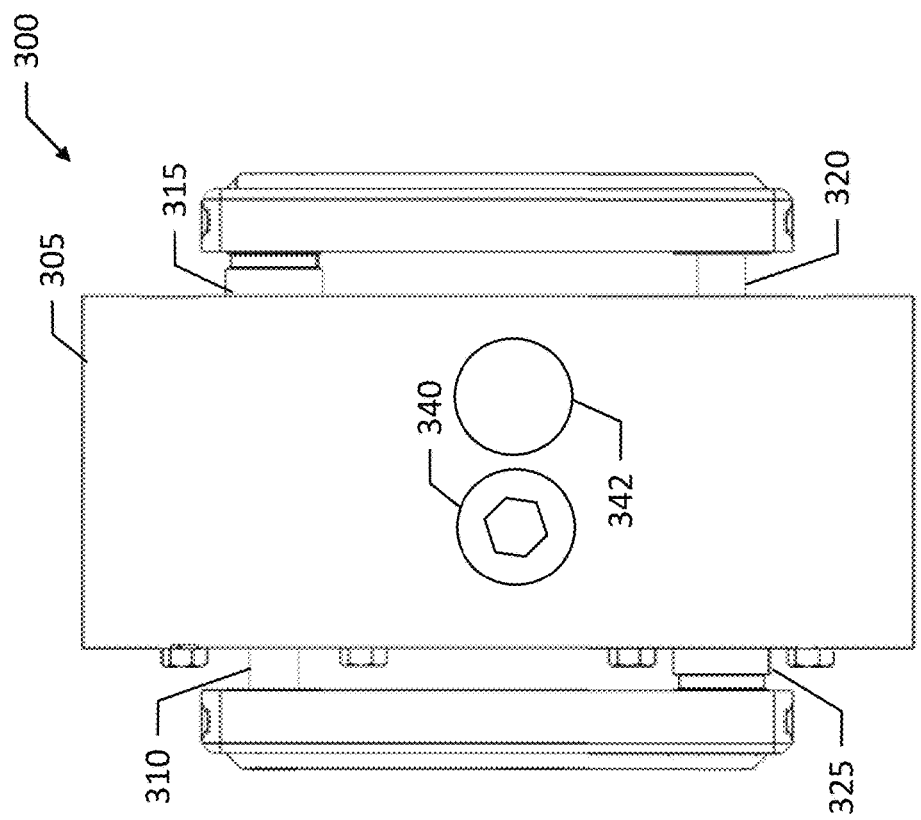
Figure 13:
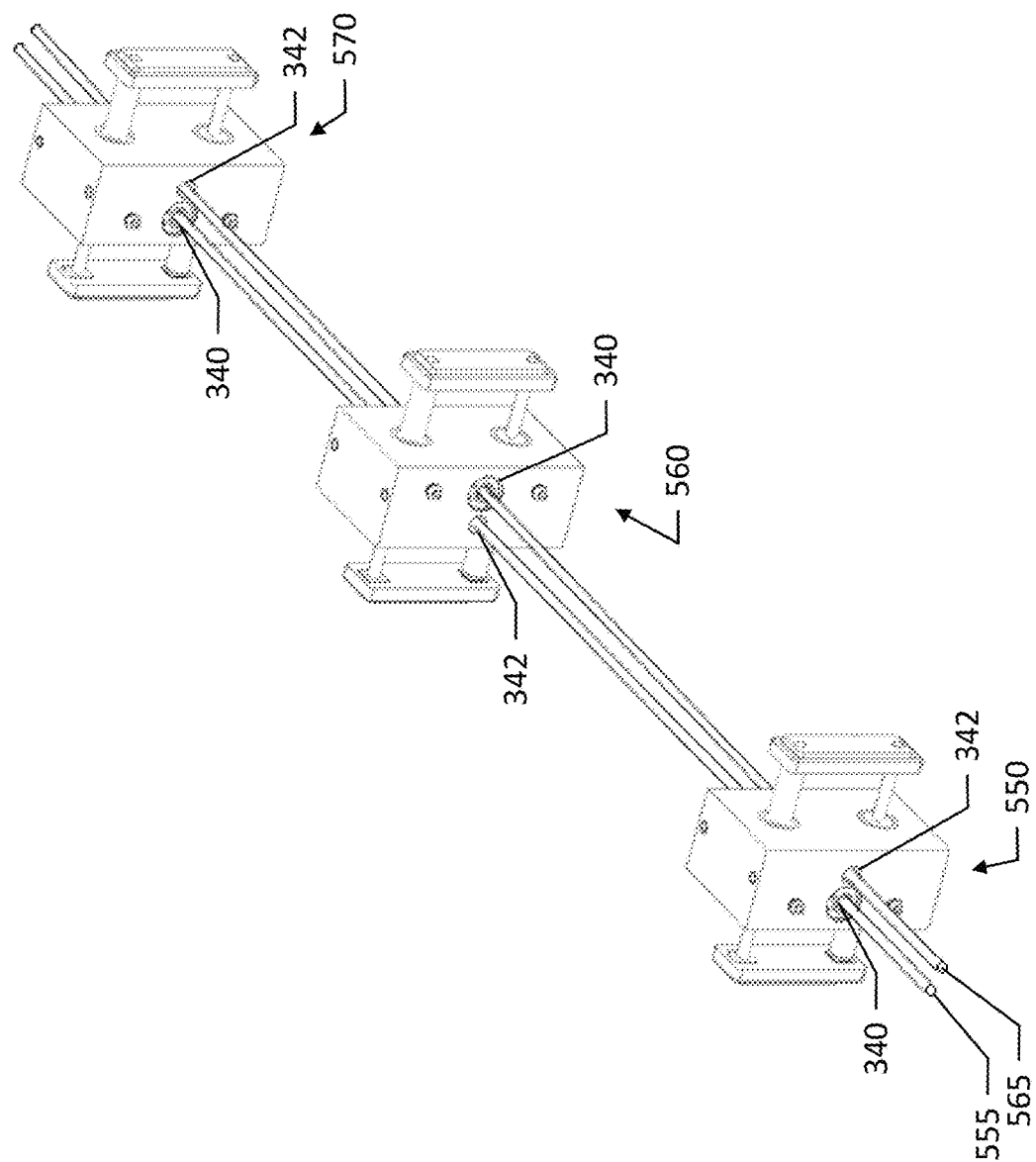
Figure 14:
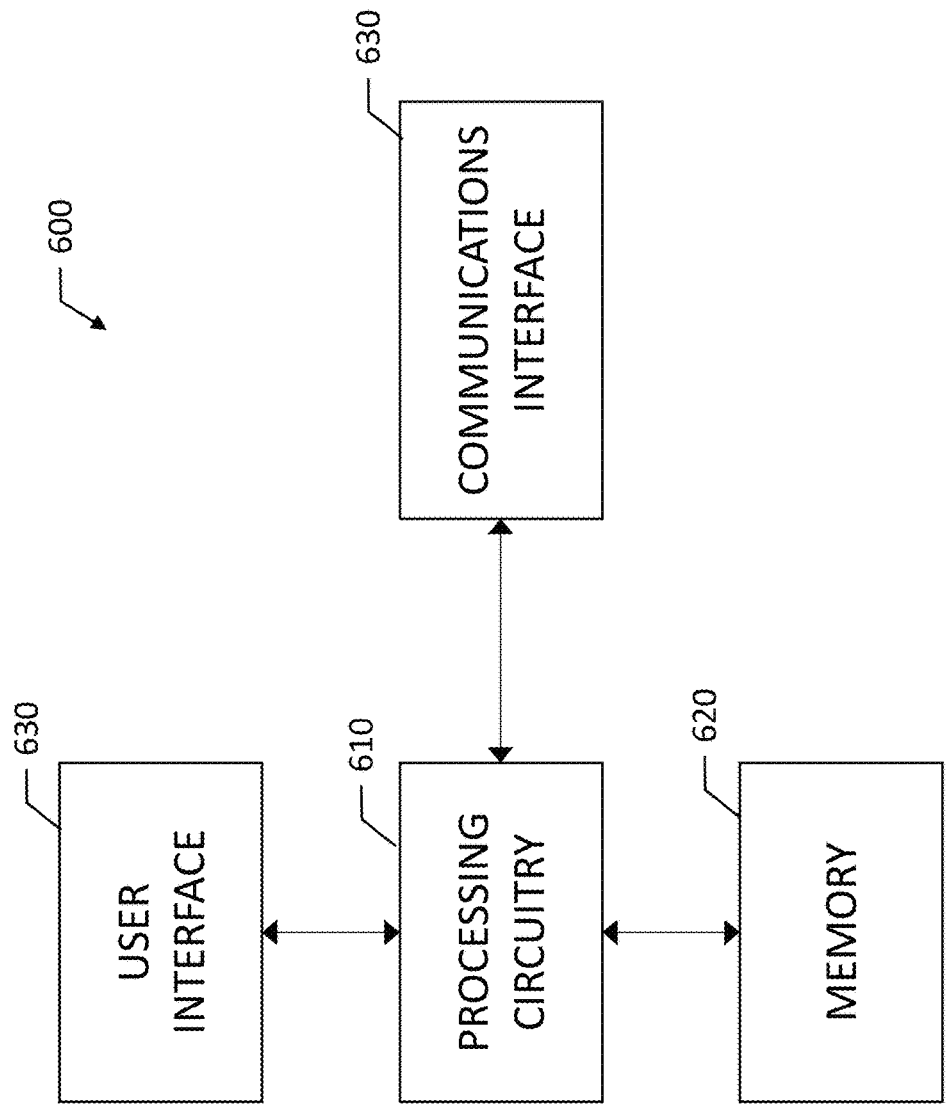
Figure 15:
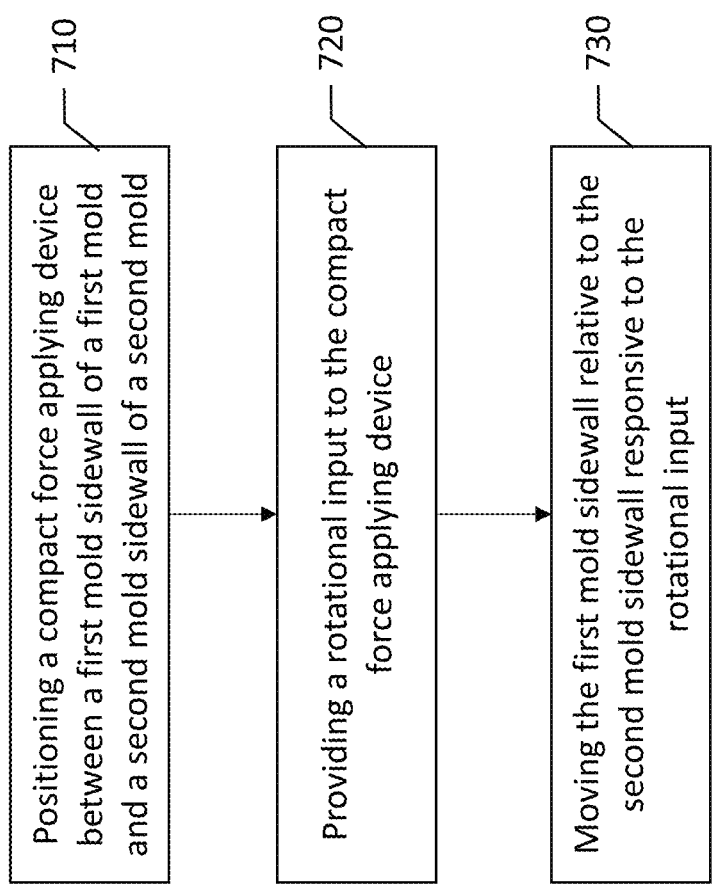

Having thus described the invention in general terms, reference will now be made to the accompanying drawings, which are not necessarily drawn to scale, and wherein:

FIG. 1 illustrates an example embodiment of a direct chill casting mold according to the prior art;

FIG. 2 illustrates an ingot formed through direct chill casting according to the prior art;

FIG. 3 illustrates a top view of a direct chill casting mold having sides capable of being flexed in an un-flexed configuration according to an example embodiment of the present disclosure;

FIG. 4 illustrates a top view of a direct chill casting mold having sides capable of being flexed in a flexed configuration according to an example embodiment of the present disclosure;

FIG. 5 illustrates a top view of a pair of direct chill casting mold assemblies positioned for a direct chill casting operation with compact force applying devices positioned therebetween according to an example embodiment of the present disclosure;

FIG. 6 illustrates a top view of a pair of direct chill casting mold assemblies positioned for a direct chill casting operation with compact force applying devices positioned therebetween and imparting curvatures to the mold sidewall assemblies according to an example embodiment of the present disclosure;

FIG. 7 is a compact force applying device according to an example embodiment of the present disclosure;

FIG. 8 is a cut-away view of internal components of a compact force applying device according to an example embodiment of the present disclosure;

FIG. 9 is an section view of internal components of a compact force applying device according to an example embodiment of the present disclosure;

FIG. 10 is a section view of internal components of a compact force applying device in an extended position according to an example embodiment of the present disclosure;

FIG. 11 is a section view of internal components of a compact force applying device in a retracted position according to an example embodiment of the present disclosure;

FIG. 12 is a compact force applying device as shown in FIG. 7 in a retracted position according to an example embodiment of the present disclosure;

FIG. 13 illustrates a system implementing several compact force applying devices operated by two different drive shafts according to an example embodiment of the present disclosure;

FIG. 14 illustrates a schematic diagram of a controller for controlling one or more compact force applying devices according to an example embodiment of the present disclosure; and FIG. 15 illustrates a flowchart of a process by which a compact force applying device is used according to an example embodiment of the present disclosure.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention generally relate to a mechanism by which two objects are pulled together and pushed apart. Such mechanisms exist in various form factors using various force-exerting means; however, embodiments described herein include a compact device for application of force between two objects. Embodiments of the present disclosure employ a gearbox configured to minimize a space occupied by the force applying device that is situated between two objects.

Embodiments described herein are suitable for use in various applications as will be appreciated by one of ordinary skill in the art. While a wide variety of applications exist for embodiments of the present disclosure, an example embodiment is described with respect to a direct chill casting process where the compact force applying device described herein can be used between adjacent molds. The example implementation is described below for thoroughness of understanding.

Vertical direct chill casting is a process used to produce ingots that may have large cross sections for use in a variety of manufacturing applications. The process of vertical direct chill casting begins with a horizontal table containing one or more vertically-oriented mold cavities disposed therein. Each of the mold cavities is initially closed at the bottom with a starting block or starting plug to seal the bottom of the mold cavity. Molten metal is introduced to each mold cavity through a metal distribution system to fill the mold cavities. As the molten metal proximate the bottom of the mold, adjacent to the starting block solidifies, the starting block is moved vertically downward along a linear path. The movement of the starting block may be caused by a hydraulically-lowered platform to which the starting block is attached. The movement of the starting block vertically downward draws the solidified metal from the mold cavity while additional molten metal is introduced into the mold cavities. Once started, this process moves at a relatively steady-state for a semi-continuous casting process that forms a metal ingot having a profile defined by the mold cavity, and a height defined by the depth to which the platform and starting block are moved.

During the casting process, the mold itself is cooled to encourage solidification of the metal prior to the metal exiting the mold cavity as the starting block is advanced downwardly, and a cooling fluid is introduced to the surface of the metal proximate the exit of the mold cavity as the metal is cast to draw heat from the cast metal ingot and to solidify the molten metal within the now-solidified shell of the ingot. As the starting block is advanced downward, the cooling fluid may be sprayed directly on the ingot to cool the surface and to draw heat from within the core of the ingot.

The direct chill casting process enables ingots to be cast of a wide variety of sizes and lengths, along with varying profile shapes. While rectangular ingots are most common, other profile shapes are possible. Circular profile billets benefit from a uniform shape, where the distance from the external surface around the billet to the core is equivalent around the perimeter. However, rectangular ingots lack this uniformity of surface-to-core depth and thus have additional challenges to consider during the direct chill casting process.

A direct chill casting mold to produce an ingot with a rectangular profile does not have a perfectly rectangular mold cavity due to the deformation of the ingot as it cools after leaving the mold cavity. The portion of the ingot exiting the mold cavity as the platform and the starting block descend retains a molten or at least partially molten core inside the solidified shell. As the core cools and solidifies, the external profile of the ingot changes such that the mold cavity profile, while it defines the shape of the final, cooled ingot, does not have a shape or profile that is identical to the final, cooled ingot.

FIG. 1 is an example embodiment of a conventional direct chill casting mold 100 which would be received within a table or frame assembly of a direct chill casting system. As shown, the mold 100 includes first 110 and second 120 opposing side walls extending between first 130 and second 140 end walls of the mold cavity. The first and second opposing side walls 110, 120 and the first and second end walls 130, 140, combine to form the mold cavity 150 having a generally rectangular profile. The first and second opposing side walls 110, 120, have an arcuate shape, or at least some degree of curvature to the wall profile. This shape enables the cast ingot to have substantially flat opposing sides during a steady-state casting operation of the direct chill casting process. The end walls 130 and 140 may also have a specified shape, which may include a curvature, a series of flat sides arranged in an arcuate shape, a compound curvature, or a straight side, for example. The "steady-state" portion of the casting process, as described herein, is the portion of the casting process after the initial start-up phase or start up casting phase and before the end of the casting process or ending casting phase. Steady-state casting occurs when the temperature profile in the portion of the ingot exiting the mold cavity remains constant or near constant. Different casting control parameters may be desired at each phase of the casting from starting phase to steady-state phase to ending phase based on the type of material being cast.

While direct chill casting molds have been designed and developed to generate an ingot having substantially flat sides on its rectangular profile for the ingot portion produced during a steady-state portion of the casting process, the start-up process of direct chill casting includes challenges that distinguish the start-up casting phase process and the initial portion of the ingot formed during the start-up casting phase process from the steady-state phase of the casting process and the portion of the ingot formed during steady-state casting.

During the start-up phase of direct chill casting, high thermal gradients induce thermal stresses that cause deformation of the ingot in manners that are distinct from those experienced during the steady-state phase of casting. Due to the changes in thermal gradients and stresses experienced in the start-up phase versus the steady-state phase of casting, a constant-profile mold cavity results in a non-uniform profile of the ingot portion cast during the start-up phase, also known as the butt, and the ingot cast during the steady-state casting phase. As the portion produced during steady-state casting forms the majority of the ingot, the mold profile may be designed such that the opposed sides and ends of an ingot are substantially flat. This may result in a butt of the ingot formed during the start-up phase lacking substantially flat sides, as illustrated in the cast ingot cross-section of FIG. 2. The illustrated embodiment of FIG. 2 depicts a basic cross-section of an ingot mold during the casting process. As illustrated, the molten metal 161 is received within the cavity of the mold, between mold side walls 110 and 120, where the molten metal transitions to solid metal proximate the sump indicated by dashed line 163. The starting block 157 of the illustrated position has already descended with the platform 159 in the direction of arrow 162, and the casting is presently in the steady-state phase, with the sides 165 of the ingot 160 being substantially flat. The portion of the ingot 160 produced during the start-up phase is shown adjacent to the starting block 157 with a profile that is swollen 170 with respect to the desirable flat sides 175 of the steady-state casting phase.

The deformation 170 of the ingot portion produced during the start-up phase may not be usable depending upon the end-use of the ingot, such that the portion of the ingot formed during the start-up period may be sacrificial (i.e., cut from the ingot and repurposed/re-cast). This sacrificial butt portion of the ingot may be substantial in size, particularly in direct chill casting molds that have relatively large profiles, and while the butt may be re-cast so the material is not lost, the lost time, reheating/re-melting costs and labor associated with the lost portion of the ingot, and the reduced maximum size potential of an ingot result in losses in efficiency of the direct chill casting process. Similar issues may exist at the end of a casting in forming the "head" of the ingot or billet, where casting ceases to be steady-state and may require specific control parameters to maximize the useable portion of the ingot and reduce waste.

To solve or improve upon the issues described above, a direct chill casting mold can employ flexible opposing side walls that may be dynamically moved during the casting process to eliminate the butt swell of conventional direct chill ingot casting molds to reduce waste and to improve the efficiency with which ingots are cast. Direct chill casting molds as described herein may include an opposed pair of casting surfaces on side walls of the mold that are flexible allowing them to change shape while the mold is casting an ingot. Each of the opposed side walls may include two or more contact portions or force receiving elements, each configured to receive a force that causes the opposed side walls of the mold to move dynamically and change shape during the casting process. The forces applied to the two or more contact regions may be independent and may include forces in opposing directions, as described further below.

The contact regions may optionally be repositionable along the length of the opposing side walls to enable greater control over the shape of the side wall resulting from the forces applied.

FIG. 3 illustrates a top-view of a direct chill casting mold assembly 200 according to an example embodiment of the present invention. As shown, the mold assembly 200 includes first and second opposing side wall assemblies 210, 220, and first and second end wall assemblies 230, 240. Each of the opposing side wall assemblies 210, 220 includes a side wall of the mold cavity 250 that cooperates with end walls of end wall assemblies 230 and 240 to form the profile of the mold cavity which is the shape of the perimeter of the mold cavity. FIG. 4 illustrates a top-view of the direct chill casting mold assembly 200 of FIG. 3 with a curvature imparted to the side wall assemblies 210, 220.

Various mechanisms can be employed to impart the curvature to the side wall assemblies of the direct chill casting mold. However, in practice, direct chill casting molds are often arranged in a set of direct chill casting molds positioned adjacent to one another above a casting pit. The size of the casting pit and the frame above the casting pit supporting the direct chill casting molds limits the number of direct chill casting molds that can be used during a single casting operation. Positioning the direct chill casting molds as close to one another as feasible improves the capacity of the casting pit and system and thereby the overall efficiency of a casting operation.

FIG. 5 illustrates how two direct chill casting mold assemblies 200 are arranged adjacent to one another when positioned within a mold frame 205 above a casting pit. The mold assemblies 200 can be supported by the mold frame in a variety of ways, with the mold assembly supports omitted from the illustration for ease of understanding. As shown, the mold side walls 210, 220 are separated from one other. In the absence of movement of the sidewalls, the mold assemblies can abut one another. However, in order to allow flexing of the sidewalls for purposes as described above, the mold assemblies must be separated to some degree. Further, the mechanism configured to impart the flexing of the sidewalls must be accommodated. Compact force applying device 300 are illustrated between the mold side walls 210 and 220. Where a mold sidewall is not adjacent another mold sidewall but instead the mold frame 205, compact force applying devices 305 can be employed which are substantially similar to compact force applying devices 300, but modified, at least temporarily, to be positioned between the mold sidewall and the frame. These force applying devices, in a compact configuration, enable the mold assemblies to be positioned relatively closer together. Large force applying devices would require significant space between the mold assemblies, thereby increasing the separation distance, lowering the capacity of the casting operation and therefore reducing efficiency of the casting operation. Embodiments described herein provide a compact force applying device that can be positioned between the mold sidewalls while requiring substantially less separation space between mold assemblies than conventionally available devices. Embodiments of a compact force applying device described herein can be, for example, around three inches wide, with a stroke (between minimum and maximum extension of the threaded shafts described below) of greater than three inches, such as four inches or more. Embodiments of the present disclosure can be larger or smaller and the aforementioned approximate dimensions are for relative scale purposes. Further, the force generated by compact force applying devices of embodiments described herein can exceed 1,000 pounds.

FIG. 6 illustrates an example embodiment of two adjacent direct chill casting mold assemblies 200 whereby two compact force applying devices 300 are disposed between the two mold assemblies and are shown applying a force to adjacent sidewall assemblies (210, 220) thereby imparting a curvature to the mold sidewall assemblies. Further, compact force applying devices 305 disposed between the mold frame 205 and mold sidewalls (210, 220) impart a bend to a respective mold sidewall. As described above, to improve the efficiency of the casting operation, it is advantageous to minimize the space between adjacent mold assemblies to maximize casting pit utilization. While the example embodiment described herein is used within a direct chill casting operation, it is appreciated that embodiments of the compact force applying device described herein can be used in a variety of applications, particularly where operational space is a design factor or consideration. For example, embodiments can be employed in separating objects, such as separating a objects having an interference fit in relatively tight quarter, such as a ball joint from a control arm in an automotive application.

The compact force applying device of embodiments is used to apply forces on either side of the device that are equal and opposite. When disposed between two mold assemblies as described above, the force across the device is balanced and the device remains substantially stationary. Embodiments can further be employed in configurations where the compact force applying device is affixed on one side to a stationary object, and the force applied to the other side causes movement.

FIG. 7 illustrates an example embodiment of a compact force applying device 300 of an example embodiment. The illustrated embodiment includes a gearbox 305 from which extends a first shaft 310 and opposing second shaft 315 as a first pair, along with third shaft 320 and opposing fourth shaft 325 as a second pair. While the illustrated embodiment includes two pairs of opposing shafts, embodiments can have more or fewer pairs of shafts. Each pair of shafts is generally parallel to the other pair(s) of shafts for the equal provision of force as described herein. The example embodiment of FIG. 7 further illustrates a first attachment plate 330 and a second attachment plate 335. However, the attachment plates are merely exemplary of an attachment mechanism through which the compact force applying device 300 can be secured between the objects to which force is being applied.

The attachment plates engage the threaded shafts in such a way as to hold them rotatably fixed, such that they do not turn about their axes. While the attachment plates are illustrated to be substantially parallel to a plane through a center of the gearbox of an example embodiment, this is not necessary. For example, in the use case of the continuous casting mold operation, a taper may be imparted to a mold sidewall, with a top edge of the first attachment plate 330 closer to a top edge of the second attachment plate 335 than a distance between the bottoms of the first attachment plate and the second attachment plate. As described further below, if the threads-per-inch of the thread pitch of the threaded shafts are equal, the relative angles of the first attachment plate 330 and the second attachment plate 335 would be maintained as they travel. The pairs of opposing shafts are also able to apply differing forces than other pairs of opposing shafts. For example, in the embodiment where a taper is applied to a mold sidewall, the pair of shafts (e.g., the first shaft 310 and the second shaft 315) that impart more deflection to the mold sidewalls may also be exerting a greater force than the lower pair of shafts (e.g., the third shaft 320 and the fourth shaft 325), even as the pairs of opposing shafts move in concert.

Also illustrated is a drive socket 340 configured to be rotated to cause the opposing pairs of shafts to extend and retract in dependence of the direction in which the drive socket is turned 340. The drive socket 340 of an example embodiment includes a keyway, such as a hexagonal keyway though the keyway may be of any profile that enable positive rotational force to be imparted by a key shaft engaging the keyway. The keyway can extend through the worm gear such that the compact force applying device 300 can be moved laterally along the key shaft for positioning, while the key shaft remains engaged with the keyway and capable of rotating the drive socket 340 in concert with rotation of the key shaft. Embodiments of the compact force applying device optionally further include a through hole 342, the function of which is described further below. The mechanism by which the pairs of shafts retract and extend is detailed further below.

FIG. 8 illustrates a perspective view of the compact force applying device of FIG. 7 with a housing of the gearbox 305 removed for ease of understanding. As shown, each of the shafts of the pairs of shafts are supported by bearings, such as bearing 316 for second shaft 315 and bearing 321 for third shaft 320 visible in the view of FIG. 8. A worm gear 345 is driven by the drive socket 340. The worm gear 345 engages a first worm wheel gear 350 and second worm wheel gear 355. The teeth of the worm wheel gears is not properly illustrated in the figures, but is apparent to one of ordinary skill in the art. Turning of the drive socket 340 causes each of the first worm wheel gear 350 and the second worm wheel gear 355 to turn in opposite directions.

FIG. 9 illustrates a cross section of the worm gear 345, the first worm wheel gear 350, and the second worm wheel gear 355 as positioned within the gearbox. Also shown is a first gear shaft 400 and a second gear shaft 430. A first end 410 of the first gear shaft 400 includes a threaded hole 410 of a relatively small diameter. A second end 415 of the first gear shaft 400 includes a threaded hole 415 of a relatively larger diameter. Similarly, a first end 420 of the second gear shaft 430 includes a threaded hole of a relatively smaller diameter while the second end 425 of the second gear shaft includes a threaded hole of a relatively larger diameter. The first gear shaft 400 is secured to the first worm wheel gear 350 and the second gear shaft 430 is secured to the second worm wheel gear 355. As the worm gear 345 turns, the first worm wheel gear 350 and the second worm wheel gear 355 are driven. The worm wheel gears, secured to the respective gear shafts, in turn, drive the gear shafts.

FIG. 10 illustrates the cross section of FIG. 9 with the shaft pairs included and engaged with the gear shafts. Each of the shafts of the shaft pairs is externally threaded. The first shaft 310 includes a relatively smaller diameter commensurate with the diameter of the threaded hole 410, and an external thread complementary to the threaded hole 410. As illustrated in FIG. 10, the first shaft 310 is in threaded engagement with the threaded hole 410. Similarly, the third shaft 320 includes a relatively smaller diameter commensurate with the diameter of the threaded hole 420, and an external thread complementary to the threaded hole 420. The second shaft 315 includes a relatively larger diameter commensurate with the diameter of threaded hole 415, and an external thread complementary to the threaded hole 415. Similarly, the fourth shaft 425 includes a relatively larger diameter commensurate with the diameter of the threaded hole 425, and an external thread complementary to the threaded hole 425. FIG. 10 depicts the first shaft 310 threadedly engaged with the threaded hole 410, the second shaft 315 threadedly engaged with the threaded hole 415, the third shaft 320 threadedly engaged with the threaded hole 420, and the fourth shaft threadedly engaged with threaded hole 425.

As the worm gear 345 rotates and drives the first worm wheel gear 350 and second worm wheel gear 355 in opposite rotational directions, each of the shafts remains rotationally fixed, while the first gear shaft 400 and the second gear shaft 430 rotate together with their respective worm wheel gear. With the externally threaded shafts held rotationally fixed and the gear shafts rotating, the externally threaded shafts travel along the internally threaded holes. Referring now to the first gear shaft 400, in response to the first gear shaft rotating in a first direction, the first shaft 310 and the second shaft 315 are both drawn toward one another as the threads of the threaded holes of the gear shaft rotate on the rotationally fixed first shaft and second shaft. In response to the first gear shaft rotating in a second direction, the first shaft 310 and the second shaft 315 are both driven away from one another as the threads of the threaded holes of the gear shaft rotate on the rotationally fixed first shaft and second shaft.

The second gear shaft 430 is flipped relative to the first gear shaft 400 as illustrated in FIGS. 9 and 10. This is configured such that opposite rotation of the second gear shaft 430 relative to the first gear shaft 400 results in the same motion of the third shaft 320 and the fourth shaft 325 relative to the first shaft 310 and the second shaft 315. In this manner, as the worm gear 345 turns, the first shaft 310 moves toward or away from the second shaft 315 in the same direction as the third shaft 320 moves toward or away from the fourth shaft 325. Further, the thread pitches of the shafts and their respective threaded holes are equal, such that a single rotation of the gear shaft advances the first shaft 310 and the second shaft 315 the same distance toward one another or apart from one another. The same holds true for the third shaft 320 and the fourth shaft 325 and their respective threaded holes. This ensures that the first attachment plate 330 and the second attachment plate 335 shown in FIG. 8 advance toward and away from one another at consistent rates, and remain at equal displacements relative to the gear box 305 between the shafts on the same side of the gear box (e.g., the first shaft 310 and fourth shaft 325).

According to some embodiments, the first shaft 310 and the third shaft 320 can be arranged on the same side of the gearbox. In such an embodiment, with the relatively smaller diameter threaded shafts on the same side, the first shaft 310 and the third shaft 320 would not be interchangeable parts as they can be in the embodiment described above, since the first gear shaft 400 and second gear shaft 430 turn in opposite directions. Rather, if the first shaft 310 and the third shaft 320 were disposed on the same side of the gear box, the threads of the shafts would have to be opposite to one another, such that opposing rotation of the gear shafts into which the first shaft and third shaft travel continues to drive the first shaft and the third shaft in the same direction. The same is true of the second shaft 315 and the fourth shaft 325, which could be arranged on the same side of the gearbox, but would cease to be interchangeable. The gear shafts would also require threads to correspond with the unique threaded shafts of such an example embodiment. While such a configuration is possible, according to the embodiment of the figures, there are fewer unique parts of the compact force applying device since the first shaft 310 and the third shaft 320 can be interchangeable as can the second shaft 315 and the fourth shaft 320.

The thread pitch of the threaded shafts (and complementary threaded holes) along with the thread pitch of the worm gear and worm wheel gear can be configured to impart a particular degree of force. A finer thread pitch can enable a greater force to be applied to the threaded shafts with more rotations resulting in a lower degree of motion. The thread pitches of the threaded shafts, the threaded holes, the worm gear, and the worm wheel gear can be configured to apply a specific amount at the threaded shafts relative to an input force and input rotation at the worm gear. Optionally, while embodiments described above include the same thread pitches for each of the threaded shafts with the same number of threads-per-inch, embodiments described herein can use different thread pitches between different threaded shafts to impart different degrees of movement. For example, in the case of the continuous casting mold operation described above, the first shaft 310 and the second shaft 315 could include a thread pitch with fewer threads-per-inch than the third shaft 320 and the fourth shaft 325. Such an embodiment would change a taper of the mold sidewall as the compact force applying device acts on the mold sidewall, with the first shaft and second shaft causing greater movement per revolution than the third shaft and the fourth shaft.

FIG. 11 illustrates a cross section view similar to that of FIG. 10 with the first shaft 310, second shaft 315, third shaft 320, and fourth shaft 325 drawn together. As shown, the second shaft 315 includes a cavity 515 and the fourth shaft 325 also includes a cavity 525. As the first shaft 310 and the second shaft 315 are drawn toward one another, the first shaft 310 is received within the cavity 515 of the second shaft 315. Similarly, as the third shaft 320 and the fourth shaft 325 are drawn toward one another, the third shaft 320 is received within the cavity 525 of the fourth shaft 325. This configuration enables the forces applied by the first shaft 310 and the second shaft 315 to be coaxial, while also enabling a stroke of the first shaft 310 and the second shaft 315 to be greater than if the shafts were not configured to nest together as depicted in FIG. 11. FIG. 12 illustrates the compact force applying device 300 including the gearbox 305 with the first shaft 310 retracted into the gearbox and received within the second shaft 315 (depicted in FIG. 11) and the second shaft 320 retracted into the gearbox and received within the fourth shaft 325.

To ensure the forces exerted by the compact force applying device are equal and opposite, the pairs of shafts (e.g., first shaft 310/second shaft 315, and third shaft 320/fourth shaft 325) are coaxial. With coaxial forces exerted by the compact force applying device as described herein, the forces are equal and opposite, and balanced across the gearbox of example embodiments. This balance enables the compact force applying devices described herein to be suspended between the mold sidewalls without requiring load bearing structure to secure the force applying devices in place. This further reduces complexity of the mold assemblies and enables the mold assemblies to be placed relatively close together relative to larger force applying devices and those requiring a rigid superstructure to maintain the force applying devices in position.

While the illustrated embodiment includes two pairs of opposing shafts, embodiments can include one, three or any number of pairs of shafts without deviating from the basic principles of the compact force applying device described herein. Further, while the aforementioned example embodiments are employed in a direct chill casting operation, embodiments of the compact force applying devices described herein can be used in a wide variety of applications. The example use case described herein is understood to not be limiting of the compact force applying devices of the example use case.

The compact force applying device of example embodiments described above can be used between objects to which equal and opposite forces are applied by opposing shafts. However, in the example embodiment of FIGS. 5 and 6, there are compact force applying devices 305 disposed between the substantially rigid mold frame 205 and mold sidewalls. In such an example embodiment, the shafts on one side of the compact force applying device (e.g., second shaft 315 and third shaft 320) can be removed. Removal can be achieved by removing the first attachment plate 330 shown in FIG. 8, and unthreading the second shaft 315 and third shaft 320 from their respective gear shafts. The compact force applying device can then be secured to the mold frame 205 with the first shaft 310 and fourth shaft 325 attached to the mold sidewall. In this manner, the stroke is half of what the compact force applying device is capable of; however, the mold frame remains stationary such that the full stroke is not necessary.

The motive force behind the compact force applying device can, in some embodiments, be manual turning of the worm gear, such as using drive socket 340. Optionally, the drive socket can be driven automatically, such as by an electric motor controlled by a controller that determines a degree of movement and/or force required from the compact force applying device. More than one compact force applying device can be mechanically coupled to be driven at the same rate, imparting the same degree of motion and force application between them. According to some embodiments, feedback may be provided to a controller controlling the drive of the worm gear. Feedback may be in the form of a degree of motion imparted by the compact force applying device, such as movement of the mold sidewall in the aforementioned example. Feedback may optionally be in the form of a force applied, such as measured with a stress/strain gauge, for example. The feedback can be used to indicate when the worm gear should be driven in a first direction or an opposite direction, or when to hold a particular position.

Embodiments of the compact force applying device described herein can further be implemented in a system where a motive force can be used for imparting movement to more than one compact force applying device while also allowing repositioning of the compact force applying device. FIG. 13 illustrates an example embodiment of three compact force applying devices, including first device 550, second device 560, and third device 570. The arrangement illustrated in FIG. 13 may include an arrangement between two adjacent sidewalls of a mold similar to the example implementation described above. As illustrated, the drive socket 340 includes a keyway through the worm gear of each compact force applying device. The second device 560 is shown rotated 180-degrees relative to the first device 550 and the third device 570. A first drive shaft 555 is illustrated passing through the drive socket 340 of the first device and the drive socket 340 of the third device. However, the first drive shaft 555 passes through the through hole 342 of the second device 560. In response to rotation of the first drive shaft 555, the worm gear of the first device 550 and the worm gear of the third device 570 is driven and imparts motion to the shafts of the respective devices. However, as the first drive shaft passes through the through hole 342 of the second device 560, the worm gear is not engaged, and the shafts of the second device are not moved responsive to rotation of the first drive shaft. A second drive shaft 565 is shown passing through the through hole 342 of the first device 550 and the third device 570, but engaging through the drive socket 340 of the second device 560. Thus, in response to rotation of the second drive shaft 565, the worm gear of the second device 560 rotates imparting motion to the shafts of the second device, while the worm gears of the first device 550 and the third device 570 are not engaged by the second drive shaft 565. In this manner, movement of the shafts of the first device 550 and third device 570 are kept in concert and driven by the first drive shaft 555 while the second device 560 moves independently based on the second drive shaft 565. This configuration enables different application of force proximate a center of a mold sidewall than at locations away from the center. Further, the motion can be imparted through motors controlled by a controller during a continuous casting mold operation.

The controller of an example embodiment can a receive an indication, such as from a user or from a separate computing device, of movement or force to be imparted using the compact force applying device of example embodiments. A controller of an example embodiment is illustrated in the schematic diagram of FIG. 14. As shown, in the illustrated embodiment, the controller 400 may include processing circuitry 610 and, in some embodiments, may further include memory 620. The processing circuitry may be in communication with, include or otherwise control a user interface 630 and/or a communication interface 640. As such, the processing circuitry may be embodied as a circuit chip (e.g., an integrated circuit chip) configured (e.g., with hardware, software, or a combination of hardware and software) to perform operations described herein.

The processing circuitry 610 may be embodied in a number of different ways. For example, the processor may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor may comprise a plurality of processors. The plurality of processors may be in operative communication with each other and may be collectively configured to perform one or more functionalities of a system for handling, storing, transporting, or distributing medication as described herein. The plurality of processors may be embodied on a single computing device or distributed across a plurality of computing devices. In some example embodiments, the processor may be configured to execute instructions stored in the memory or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA, or the like, the processor may be specifically configured hardware for conducting the operations described herein. Alternatively, as another example, when the processor is embodied as an executor of software instructions, the instructions may specifically configure the processor to perform one or more operations described herein.

In some example embodiments, the memory 620 may include one or more non-transitory memory devices such as, for example, volatile and/or non-volatile memory that may be either fixed or removable. In this regard, the memory 620 may comprise a non-transitory computer-readable storage medium. It will be appreciated that while the memory 620 is illustrated as a single memory, the memory may comprise a plurality of memories. The plurality of memories may be embodied on a single computing device or may be distributed across a plurality of computing. The memory may be configured to store information, data, applications, instructions and/or the like for enabling embodiments of the present invention to carry out various functions in accordance with one or more example embodiments. For example, the memory may be configured to buffer input data for processing by the processor. Additionally or alternatively, the memory may be configured to store instructions for execution by the processor. As yet another alternative, the memory may include one or more databases that may store a variety of files, contents, or data sets. Among the contents of the memory, applications may be stored for execution by the processor to carry out the functionality associated with each respective application.

A user interface 630 of example embodiments may be in communication with the processing circuitry to receive an indication of a user input at the user interface and/or to provide an audible, visual, mechanical, or other output to the user. As such, the user interface may include, for example, a user input interface 630 such as a keyboard, a mouse, a joystick, a display, a touch screen display, a microphone, a speaker, and/or other input/output mechanisms. As such, the user interface may, in some example embodiments, provide means for user control of embodiments of the present invention. In some example embodiments, one or more aspects of the user interface may be implemented on a user terminal. Accordingly, regardless of implementation, the user interface may provide input and output means to facilitate movement of the compact force applying devices as described herein.

The communication interface 640 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network and/or any other device or module in communication with the processing circuitry. Accordingly, the communication interface may, for example, include supporting hardware and/or software for enabling communications via cable, digital subscriber line (DSL), universal serial bus (USB), Ethernet, or other methods.

The controller 600 of example embodiments may be configured to control various aspects of compact force applying devices as described herein. In the above-described implementation in a direct chill casting operation, the controller can control movement of the compact force applying device to impart a specific curvature to sidewalls of the mold assembly based on a variety of inputs. For example, the alloy being cast, the speed of the casting, the temperature of the cast material, etc. can be inputs to establish the curvature and the movement of the curvature of the mold sidewall during the casting operation, where the curvature and movement of the curvature is imparted by the compact force applying devices as controlled by a controller 400 described herein.

FIG. 15 illustrates a flowchart of a process by which a compact force applying device of example embodiments is used. As illustrated, a compact force applying device is positioned between a first mold sidewall of a first mold and a second mold sidewall of a second mold as shown at 710. A rotational input is provided to the compact force applying device as shown at 720. This rotational input can be manual input (e.g., rotating a wheel, a tool, a lever, or the like) or automated (e.g., using an electric motor connected to a controller as described above). The first mold sidewall is moved relative to the second mold sidewall responsive to the rotational input as shown at 730. This movement can be controlled, for example, by controller 600 using input such as a desired curvature to impart to the mold sidewalls. Embodiments of the process can include multiple compact force applying devices between mold sidewalls, each with independent control to establish a desired curvature where displacement at different compact force applying devices may need to be different.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for application of force comprising:
   a worm gear;
   a first worm wheel gear engaged with the worm gear;
   a second worm wheel gear engaged with the worm gear;
   a first gear shaft coaxial to the first worm wheel gear and rotatably coupled to the first worm wheel gear;
   a first threaded hole proximate a first end of the first gear shaft;
   a second threaded hole proximate a second end of the first gear shaft, opposite the first end of the first gear shaft;
   a first threaded shaft received by the first threaded hole;
   a second threaded shaft received by the second threaded hole;
   a second gear shaft coaxial to the second worm wheel gear and rotatably coupled to the second worm wheel gear;
   a third threaded hole proximate a first end of the second gear shaft;
   a fourth threaded hole proximate a second end of the second gear shaft, opposite the first end of the second gear shaft;
   a third threaded shaft received by the third threaded hole; and
   a fourth threaded shaft received by the fourth threaded hole;
   wherein the first threaded shaft and the second threaded shaft are configured to advance toward one another or away from one another responsive to rotation of the worm gear which rotates the first worm wheel gear and in turn the first gear shaft relative to the first threaded shaft and the second threaded shaft, and
   wherein the third threaded shaft and the fourth threaded shaft are configured to advance toward one another or away from one another responsive to rotation of the worm gear which rotates the second worm wheel gear and in turn the second gear shaft relative to the third threaded shaft and the fourth threaded shaft.

2. The apparatus of claim 1, wherein the second threaded shaft defines a cavity, wherein in response to the first threaded shaft and the second threaded shaft advancing toward one another, the first threaded shaft is received within the cavity of the second threaded shaft.

3. The apparatus of claim 2, wherein in response to the first threaded shaft and the second threaded shaft advancing toward one another or away from one another, the first threaded shaft exerts a first force on a first object coupled to the first threaded shaft, and the second threaded shaft exerts a second force on a second object coupled to the second threaded shaft, wherein the first force and the second force are equal and opposite.

4. The apparatus of claim 3, wherein the first threaded shaft and the second threaded shaft are coaxial.

5. The apparatus of claim 1, wherein the first threaded shaft and the second threaded shaft are held rotatably fixed.

6. The apparatus of claim 1, further comprising a gearbox housing the worm gear, the first worm wheel gear, the first gear shaft, the second worm wheel gear, and the second gear shaft, wherein the first threaded shaft and the fourth threaded shaft are disposed on a first side of the gearbox and the second threaded shaft and third threaded shaft are disposed on a second side of the gearbox.

7. The apparatus of claim 6, wherein the first threaded shaft, second threaded shaft, third threaded shaft, and fourth threaded shaft each move in unison at a same rate either toward the gearbox or away from the gearbox in response to rotation of the worm gear.

8. The apparatus of claim 7, wherein a first object is attached to the first threaded shaft and the fourth threaded shaft and a second object is attached to the second threaded shaft and the third threaded shaft, wherein the first threaded shaft and the second threaded shaft apply a first force between the first object and the second object in response to a first rotation of the worm gear, and wherein the third threaded shaft and the fourth threaded shaft apply a second force between the first object and the second object in response to the first rotation of the worm gear, wherein the first force is different from the second force.

9. The apparatus of claim 1, wherein the first threaded hole comprises a first thread pitch and a first diameter, wherein the second threaded hole comprises a second thread pitch and a second diameter, wherein the first thread pitch is equal to the second thread pitch, and wherein the first diameter is different than the second diameter.

10. The apparatus of claim 9, wherein the second threaded shaft defines a cavity therein, wherein the cavity comprises a diameter greater than the first diameter.

11. The apparatus according to claim 1, wherein the gearbox housing defines a through hole parallel to an axis of the worm gear.

12. The apparatus according to claim 1, wherein rotational force received at the worm gear is converted by the apparatus into axial force applied along an axis along which the first gear shaft extends.

13. The apparatus according to claim 12, wherein the axial force is configured to be applied between adjacent mold side walls of a pair of direct chill casting molds.

14. The apparatus according to claim 1, wherein the first threaded shaft and the second threaded shaft are held rotatably fixed.

15. An apparatus for application of force comprising:
    a gearbox housing, the gearbox housing containing:
       a worm gear;
       a worm wheel gear engaged with the worm gear;
       a gear shaft coaxial to the worm wheel gear and rotatably coupled to the worm wheel gear, the gear shaft defining:
          a first threaded hole proximate a first end of the gear shaft;
          a second threaded hole proximate a second end of the gear shaft, opposite the first end;

a first threaded shaft received by the first threaded hole, wherein the first threaded shaft extends outside of the gearbox housing; and a second threaded shaft received by the second threaded hole, wherein the second threaded shaft extends outside of the gearbox housing, wherein the first threaded shaft and the second threaded shaft are configured to advance toward one another or away from one another responsive to rotation of the worm gear which rotates the worm wheel gear and in turn the gear shaft relative to the first threaded shaft and the second threaded shaft, wherein the first threaded hole comprises a first thread pitch and a first diameter, wherein the second threaded hole comprises a second thread pitch and a second diameter, wherein the first thread pitch is equal to the second thread pitch, and wherein the first diameter is different than the second diameter.

16. The apparatus according to claim 15, wherein the gearbox housing defines a through hole parallel to an axis of the worm gear.

17. The apparatus according to claim 15, wherein rotational force received at the worm gear is converted by the apparatus into axial force applied along an axis along which the gear shaft extends.

18. The apparatus according to claim 17, wherein the axial force is configured to be applied between adjacent mold side walls of a pair of direct chill casting molds.

19. The apparatus according to claim 15, wherein the first threaded shaft and the second threaded shaft are held rotatably fixed.

20. The apparatus according to claim 15, wherein the second threaded shaft defines a cavity therein, wherein the cavity comprises a diameter greater than the first diameter.

* * * * *